(12) United States Patent
Robinette et al.

(10) Patent No.: US 8,485,930 B2
(45) Date of Patent: Jul. 16, 2013

(54) VARIABLE RATIO POWER-SPLIT HYBRID TRANSMISSION

(75) Inventors: Darrell Lee Robinette, Fenton, MI (US); Clyde A. Bulloch, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 12/962,871

(22) Filed: Dec. 8, 2010

(65) Prior Publication Data

US 2012/0149513 A1 Jun. 14, 2012

(51) Int. Cl.
*F16H 37/06* (2006.01)
(52) U.S. Cl.
USPC ............................................. 475/5; 475/207
(58) Field of Classification Search
USPC ............................................ 475/5, 207, 218
See application file for complete search history.

(56) References Cited

U.S. PATENT DOCUMENTS

| | | | |
|---|---|---|---|
| 7,086,977 B2 * | 8/2006 | Supina et al. | 475/5 |
| 7,427,252 B2 * | 9/2008 | Holmes | 475/5 |
| 2012/0065015 A1 * | 3/2012 | Tamai et al. | 475/5 |
| 2012/0065016 A1 * | 3/2012 | Tamai et al. | 475/5 |

* cited by examiner

*Primary Examiner* — Sherry Estremsky
(74) *Attorney, Agent, or Firm* — Quinn Law Group, PPLC

(57) ABSTRACT

A transmission includes an input member, an output member, and a planetary gear set having a first, a second, and a third member. A first electric motor/generator has a first rotor connected for rotation with the first member. A second electric motor/generator has a second rotor connected for rotation with the second member. A first set of intermeshing gears has a first gear ratio, and a second set of intermeshing gears has a second gear ratio different than the first gear ratio. A first torque-transmitting mechanism is engageable to establish torque flow between the planetary gear set and one of the input member and the output member through the first set of intermeshing gears. A second torque-transmitting mechanism is engageable to establish torque flow between the planetary gear set and the one of the input member and the output member through the second set of intermeshing gears.

13 Claims, 4 Drawing Sheets

VARIABLE RATIO POWER-SPLIT HYBRID TRANSMISSION

TECHNICAL FIELD

The invention relates to a hybrid electro-mechanical transmission.

BACKGROUND

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and an electrically-variable operating mode are established by engaging brakes and/or clutches in different combinations and controlling the engine and motor/generators. The various operating modes are advantageous, as they may be used to improve fuel economy.

SUMMARY

A transmission is provided having two different ratios at which power is split in electrically-variable operating modes. The transmission includes an input member, an output member, and a planetary gear set having a first member, a second member, and a third member. A first electric motor/generator has a first rotor connected for rotation with the first member of the planetary gear set. A second electric motor/generator has a second rotor connected for rotation with the second member of the planetary gear set. A first set of intermeshing gears has a first gear ratio, and a second set of intermeshing gears has a second gear ratio different than the first gear ratio. A first torque-transmitting mechanism is selectively engageable to establish torque flow between the planetary gear set and one of the input member and the output member through the first set of intermeshing gears. A second torque-transmitting mechanism is selectively engageable to establish torque flow between the planetary gear set and the one of the input member and the output member through the second set of intermeshing gears. Thus, the transmission is operable in a first output-split electrically-variable operating mode when the first torque-transmitting mechanism is engaged, the engine is on, and the motor/generators function as motors or generators. The transmission is also operable in a second output-split electrically-variable operating mode when the second torque-transmitting mechanism is engaged, the engine is on, and the motor/generators function as motors or generators. Due to the sets of intermeshing gears and the torque-transmitting mechanisms, the first and second output-split electrically-variable operating modes have different gear ratios between the input member and the planetary gear set or between the planetary gear set and the output member. The gear ratios can be selected to allow the motor/generator speeds to remain within a predetermined range at which the motor/generators are most efficient.

The above features and advantages and other features and advantages of the present invention are readily apparent from the following detailed description of the best modes for carrying out the invention when taken in connection with the accompanying drawings.

DETAILED DESCRIPTION

Figure 1:
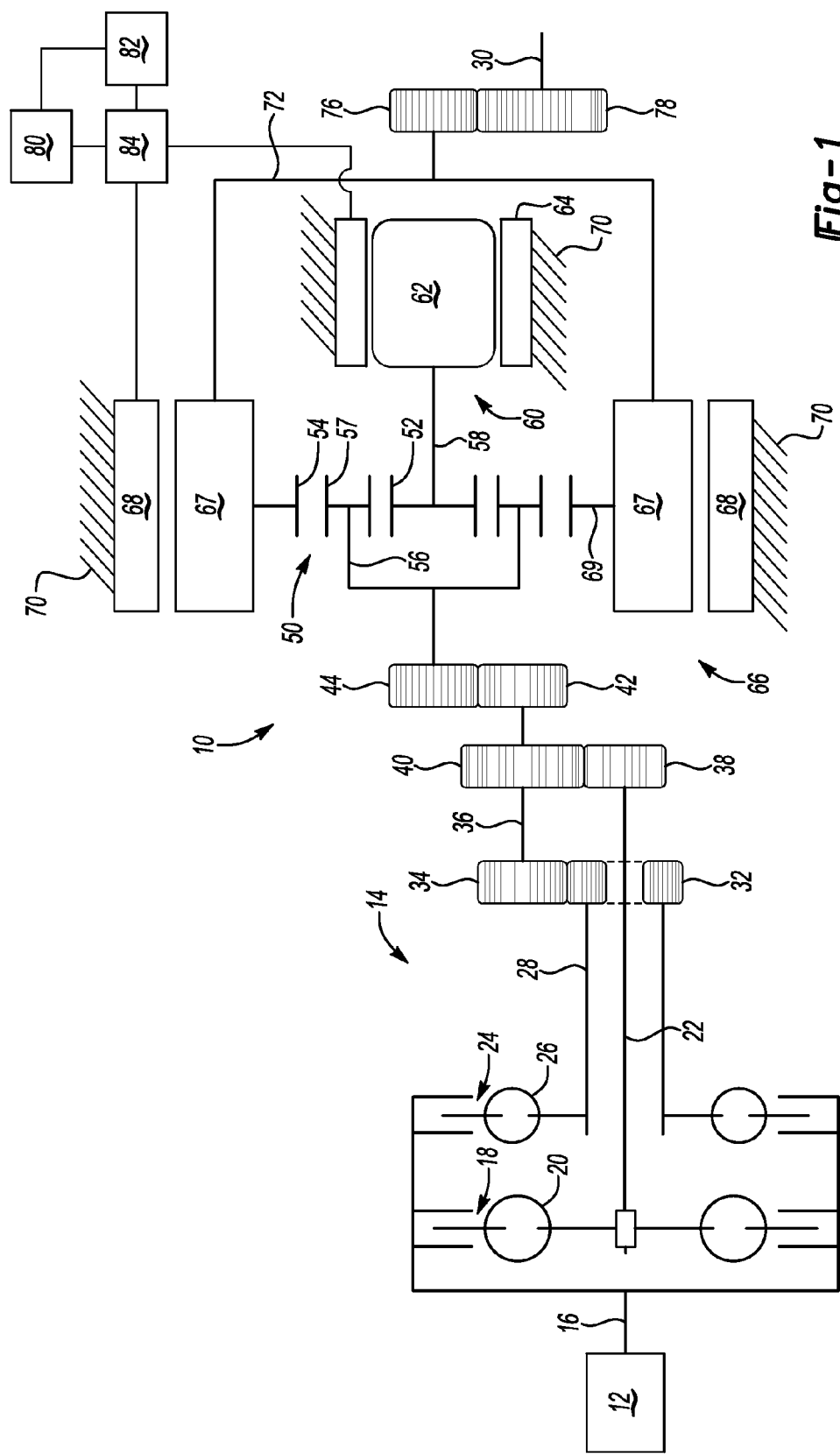
FIG. 1 is a schematic illustration of a powertrain having a first embodiment of an input-split hybrid transmission.

Referring to the drawings, wherein like reference numbers refer to like components throughout the several views, FIG. 1 shows a powertrain 10 for a vehicle that includes an engine 12 and a hybrid transmission 14. The transmission 14 has an input member 16 to which an engine output member is connected or connectable. As used herein, an "engine" includes any power source connected for providing torque at the input member 16 that is not powered by electrical power. For example, the engine 12 may be an internal combustion engine such as a gasoline or diesel engine.

A first torque-transmitting mechanism 18 is selectively engageable to transmit torque to a first input shaft 22 through a damper 20. A second torque-transmitting mechanism 24 is selectively engageable to transmit torque to a second input shaft 28 through a damper 26. The first and second input shafts 22, 28 are concentric. The torque-transmitting mechanisms 18, 24 may be synchronizers or friction clutches. Synchronizers have less hydraulic requirements than friction clutches, and thus may be used to improve system efficiency. In either instance, the torque-transmitting mechanisms 18, 24 may be selectively engaged by control signals received from an electronic controller, such as controller 82 discussed below, or from a separate transmission controller.

A transfer shaft 36 is substantially parallel to the input shafts 22, 28. A first set of intermeshing gears includes gear 38 connected for rotation with first input shaft 22, and gear 40 connected for rotation with the transfer shaft 36 and meshing with gear 38. The first set of intermeshing gears 38, 40 establish a first gear ratio from the input member 16 to the transfer shaft 36.

A second set of intermeshing gears includes gear 32 connected for rotation with second input shaft 28, and gear 34 connected for rotation with the transfer shaft 36 and meshing with gear 32. The second set of intermeshing gears 32, 34 establish a second gear ratio from the input member 16 to the transfer shaft 36.

A third set of intermeshing gears includes gear 42 connected for rotation with transfer shaft 36, and gear 44 meshing with gear 36. The transmission 14 includes a planetary gear set 50 that has a first member, sun gear member 52, a second member, ring gear member 54, and a third member, carrier member 56 that supports pinion gears 57 that mesh with both sun gear member 52 and ring gear member 54. Gear 44 is connected for rotation with carrier member 56. Thus, the third set of intermeshing gears 42, 44 transfers torque between the transfer shaft 36 and the carrier member 56.

The transmission 14 has a first motor/generator 60 with a first rotor 62 having a rotor hub 58 connected for rotation with the sun gear member 52. A stator 64 is grounded to a stationary member 70, that is a nonrotating member such as a casing of the transmission 14. The transmission 14 also has a second motor/generator 66 with a second rotor 67 having a second rotor hub 69 connected for rotation with the ring gear member 54. A stator 68 is grounded to the stationary member 70. Another hub 72 connects the second rotor 67 for common rotation with a gear member 76 of a final drive gearing arrangement. The final drive gear arrangement also includes gear 78 that meshes with gear 76 and is connected for rotation with the output member 30.

An energy storage device, such as a battery 80, is operatively connected by transfer conductors to the stators 64, 68. A controller 82 controls electrical transfer between the battery 80 and the stators 64, 68 through a power inverter 84 that changes direct current provided by the battery 80 to alternating current required for operation of the motor/generators 60, 66 (and vice versa when the motor/generators 60, 66 are operable as generators).

The powertrain 10 is operable in several distinct operating modes depending on the engagement status of the torque-transmitting mechanisms 18, 24, the state of the engine 12 (i.e., on or off), and the state of the motor/generators 60, 66 (i.e., whether on, off, and whether each is operated as a motor or a generator). For instance, if both torque-transmitting mechanisms 18, 24 are disengaged, the controller 82 may control both motor/generators 60, 66 to function as motors in a first electric-only operating mode. Torque from motor/generator 60 is added to torque from motor/generator 66 through the planetary gear set 50 to provide torque at the output member through the final drive gearing arrangement, gears 76, 78.

The powertrain 10 is also operable in a second electric-only operating mode if both torque-transmitting mechanisms 18, 24 are engaged and the controller 82 controls both motor/generators 60, 66 to function as motors. With both torque-transmitting mechanisms 18, 24 engaged, the engine 12 and the carrier member 56 are locked-up by the sets of intermeshing gears 32, 34 and 38, 40 so that they are held stationary and provide reaction torque for the motor/generators 60, 66. The motor/generators 60, 66 provide torque at the output member 30 through the final drive gearing arrangement, gears 76, 78.

The powertrain 10 is also operable in two different electrically-variable operating modes. A first electrically-variable operating mode is established when the engine 12 is on, torque-transmitting mechanism 18 is engaged, and the motor/generators 60, 66 are operated as motors or generators depending on the torque and speed requirements at the output member 30. In the first electrically-variable operating mode, the torque from the engine 12 is provided at the carrier member 56 at a gear ratio established through the first intermeshing gear set, gears 32 and 34, and the third intermeshing gear set, gears 42 and 44. Power is split through the planetary gear set 50, as torque is provided to or from the first motor/generator 60 at the sun gear member 52 and to or from the second motor/generator 66 at the ring gear member 54. The first electrically-variable operating mode is thus an input-split operating mode.

A second electrically-variable operating mode is established when the engine 12 is on, torque-transmitting mechanism 24 is engaged, and the motor/generators 60, 66 are operated as motors or generators depending on the torque and speed requirements at the output member 30. In the second electrically-variable operating mode, the torque from the engine 12 is provided at the carrier member 56 at a gear ratio established through the second intermeshing gear set, gears 38 and 40, and the third intermeshing gear set, gears 42 and 44. Power is split through the planetary gear set 50, as torque is provided to or from the first motor/generator 60 at the sun gear member 52 and to or from the second motor/generator 66 at the ring gear member 54. The second electrically-variable operating mode is thus an input-split operating mode.

The shift from the first electrically-variable operating mode to the second electrically-variable operating mode may be accomplished by control signals from the controller 82 (or another controller) to the torque-transmitting mechanisms 18, 24 when sensors indicate that the rotational speed of either rotor 62, 67 approaches a predetermined maximum rotational speed beyond which the efficiency of the motor/generators 60, 66 decrease due to increased electrical power requirements. The gear ratio of the first intermeshing gear set, i.e., the ratio of the number of teeth of gear 40 to the number of teeth of gear 38, is greater the gear ratio of the second intermeshing gear set, i.e., the ratio of the number of teeth of the gear 34 to the number of teeth of the gear 32. The speed of the input member 16 is reduced through the first intermeshing gear set, gears 38, 40, and is multiplied through the second intermeshing gear set, gears 32, 34. Thus, the transmission 14 may be referred to as a variable ratio input-split hybrid transmission.

Figure 2:
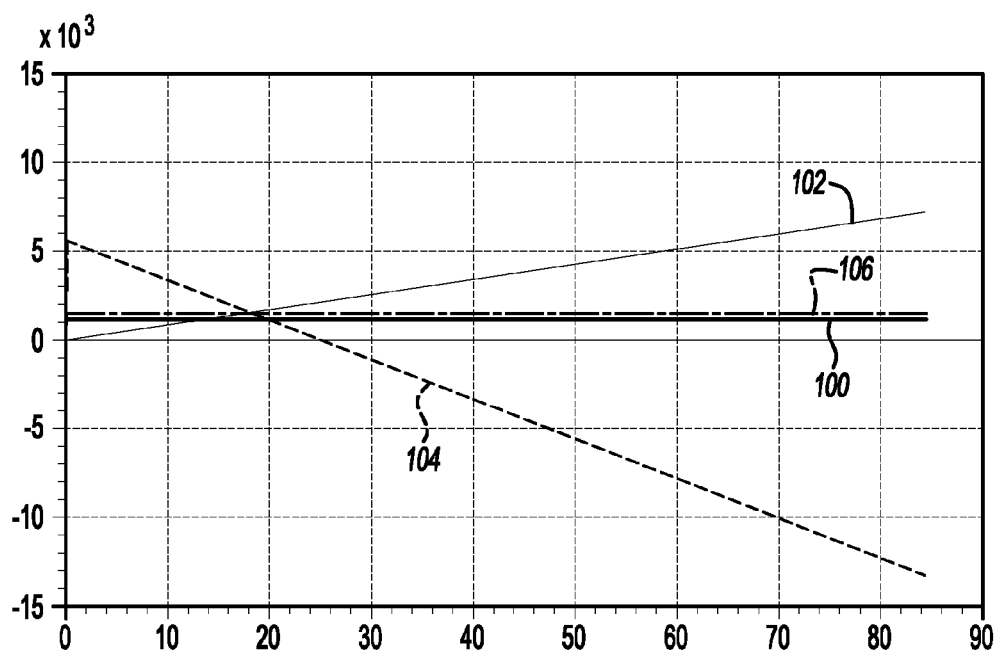
FIG. 2 is a chart of the speeds in revolutions per minute of various components of the powertrain of FIG. 1 versus vehicle speed in miles per hour when a first torque-transmitting mechanism is engaged to establish a first power-split operating mode.
Figure 3:
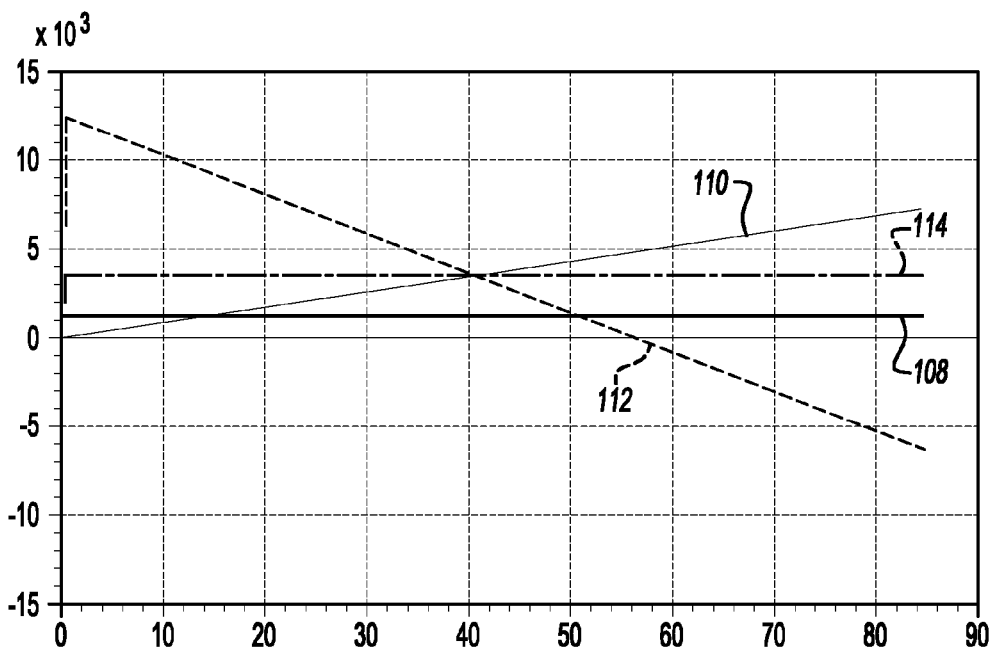
FIG. 3 is a chart of the speeds in revolutions per minute of various components of the powertrain of FIG. 1 versus vehicle speed in miles per hour when a second torque-transmitting mechanism is engaged to establish a second power-split operating mode.

The gear ratio at which torque is provided to the carrier member 56 in the second electrically-variable operating mode increases the speed of rotation of the carrier member 56 relative to the first electrically-variable operating mode. This allows the motor/generators 60, 66 to operate at lower speeds than they would in the first electrically-variable operating mode as the speed of the output member 30 increases. FIGS. 2 and 3 show theoretical speeds in revolutions per minute (rpm) of the engine 12, the rotors 62, 67 and the carrier member 56 versus vehicle speeds in miles per hour (mph) when the powertrain 10 is installed on a typical vehicle. For example, referring to FIG. 2, when the first torque-transmitting mechanism 18 is engaged, the speed of the engine 12 is shown at line 100, and is constant at an optimal operating speed of the engine 12, about 1100 rpm, over the vehicle speed range shown. The speed of the first rotor 62 is shown as line 104, and decreases from about 5500 rpm, then increases after a torque reversal when the vehicle is at about 18 mph. The speed of the second rotor 67 is shown as line 102 and increases from 0 rpm to about 7000 rpm at about 80 mph. The speed of the carrier member 56 is relatively low at about 1500 rpm. The rotor speeds increase in magnitude as the vehicle speeds increase after about 18 mph.

In order to reduce the necessary rotor speeds at higher vehicle speeds, the second torque-transmitting mechanism 24 is engaged when the vehicle speed is between about 30 miles per hour to 60 miles per hour, and likely between 40 miles per hour and 50 miles per hour, depending on gear tooth count selection for gears 32, 34, 38, 40, 42 and 44. As can be seen in FIG. 3, the speeds of the rotors 62 and 67, represented by lines 112 and 110, respectively, are lower at higher vehicle speeds when torque-transmitting mechanism 24 is engaged, than when torque-transmitting mechanism 18 is engaged (speeds shown in FIG. 2). The engine 12 is able to remain operating at its optimal operating speed, as represented by line 108. The speed of the carrier member 56, represented by line 114, is greater when the second torque-transmitting mechanism 24 is engaged, than when torque-transmitting mechanism 18 is engaged (speed of carrier member 56 shown as line 106 in FIG. 2).

The powertrain 10 may also be controlled so that the motor/generator 60 can be operated as a motor to start the engine 12 during an electric-only operating mode by engaging either torque-transmitting mechanism 18 or torque-transmitting mechanism 24. Alternatively, a separate battery (not shown), such as a 12 volt battery, may be used to start the engine 12 with both torque-transmitting mechanisms 18, 24 disengaged and a separate 12 volt starter motor (not shown).

Figure 4:
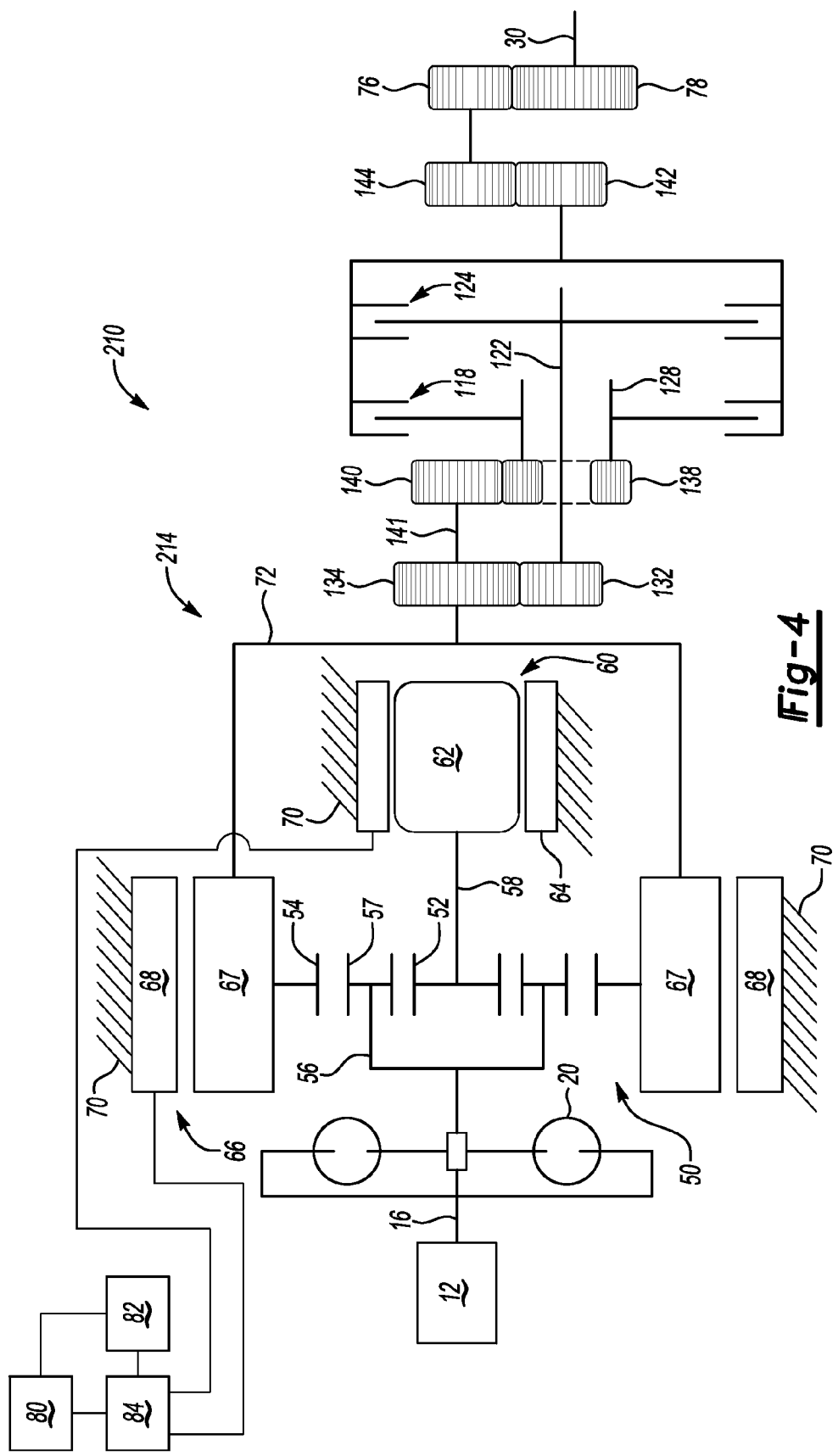
FIG. 4 is a schematic illustration of a powertrain having a second embodiment of a hybrid transmission that is an output-split transmission.

Referring to FIG. 4, another embodiment of a powertrain 210 with a hybrid transmission 214 is shown that has electrically-variable output-split operating modes through two different gear ratios, allowing the speed of the rotors 62, 67 to remain within a predetermined operating range. Components of the powertrain 210 that are the same as those of the powertrain 10 described above are referred to with the same reference numbers. The input member 16 is continuously connected for rotation with the carrier member 56 through the damper 20. Ratio-changing gear sets and torque-transmitting mechanisms are found at the output end of the transmission 214. A first intermeshing gear set includes gear 138 connected for common rotation with a first output shaft 128, and gear 140 connected for common rotation with a transfer shaft 141 that is connected with the rotor 67 and ring gear member 54. Gear 140 meshes with gear 138. A second intermeshing gear set includes gear 132 connected for rotation with second output shaft 122, and gear 134 connected for common rotation with transfer shaft 141, rotor 67 and ring gear member 54. Gear 134 meshes with gear 132. The transfer shaft 141 is generally parallel with the output shafts 122, 128.

A first torque-transmitting mechanism 118 is selectively engageable to connect first output shaft 128 for common rotation with gear 142 of a final drive gearing arrangement at the output member 30. The final drive gearing arrangement includes gear 142 meshing with gear 144, and gear 76 rotating at the same speed as gear 144 and meshing with gear 78, which rotates at the same speed as the output member 30.

A second torque-transmitting mechanism 124 is selectively engageable to connect second output shaft 122 for common rotation with gear 142. When the first torque-transmitting mechanism 118 is engaged, torque is transferred from the rotor 67 to the gear 142 at a first gear ratio established by the first intermeshing gear set 138, 140. When the second torque-transmitting mechanism 124 is engaged, torque is transferred from the rotor 67 to the gear 142 at a second gear ratio established by the second intermeshing gear set 132, 134. The speed of the rotor 67 is reduced through the first intermeshing gear set 138, 140, and is multiplied through the second intermeshing gear set 132, 134. When the engine 12 is on and the motor/generators 60, 66 are controlled to operate as motors or generators, the first torque-transmitting mechanism 118 may be engaged to establish a first electrically-variable operating mode at relatively low vehicle speeds (i.e., at relatively low speeds of the output member 30) with a speed reduction due to the first gear ratio through the first set of intermeshing gears 138, 140. As the speed of the output member 30 increases, the first torque-transmitting mechanism 118 may be disengaged, and the second torque-transmitting mechanism 124 engaged. The motor/generators 60, 66 can continue to operate within a predetermined range of speeds, while the speed of the output member 30 can increase relative to the first electrically-variable operating mode due to the second gear ratio through the second set of intermeshing gears 132, 134. Thus, the powertrain 210 may be referred to as a variable ratio output-split hybrid transmission.

The powertrain 210 is also operable in a first electric-only operating mode, with motor/generator 66 operating as a motor, or in a second electric-only operating mode with both motor/generators 60, 66 controlled to operate as motors, in both cases with the engine 12 off, thereby providing torque at the output member 30.

Figure 5:
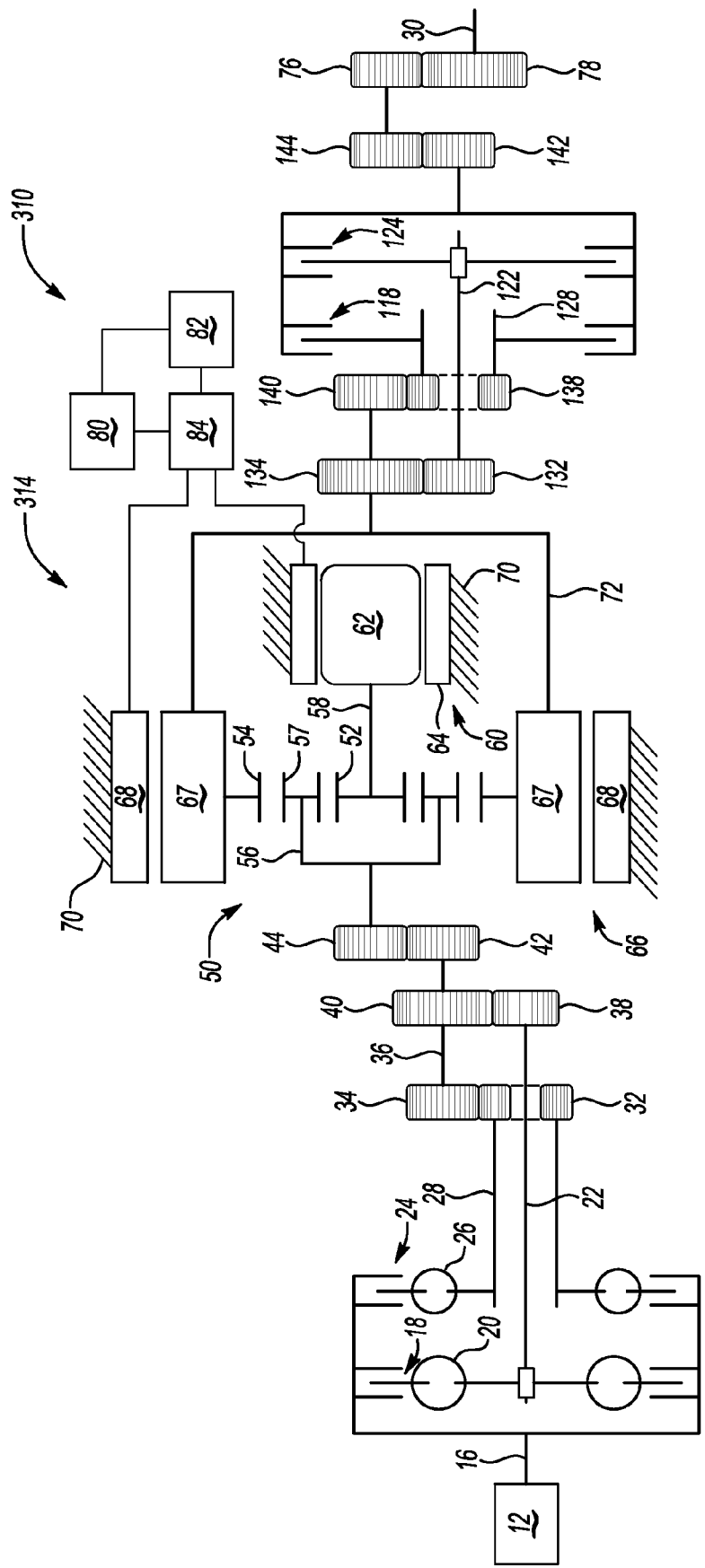
FIG. 5 is a schematic illustration of a powertrain having a third embodiment of a hybrid transmission that is a compound-split transmission.

Referring to FIG. 5, another embodiment of a powertrain 310 is shown that combines the components of the powertrain 10 and the powertrain 210 so that the powertrain 310 is operable as a compound-split electrically-variable transmission 314 with variable power-split input ratios and variable power-split output ratios. Although operable in the same manner as in the transmission 210, the torque-transmitting mechanism 118 may be referred to as a third torque-transmitting mechanism, and the torque-transmitting mechanism 124 may be referred to as a fourth torque-transmitting mechanism. The gear set 138, 140 may be referred to as a third intermeshing gear set having a third gear ratio, and the gear set 132, 134 may be referred to as a fourth intermeshing gear set having a fourth gear ratio.

With four different torque-transmitting mechanisms, there are two different ratios that may be provided between the input member 16 and the carrier member 56, and two different ratios that may be provided between the ring gear member 54 and output member 30. The range of operating speeds of the motor/generators 60, 66 can thus be limited to speeds at which the motor/generators 60, 66 are most efficient, with a minimum amount of recirculating power from motor/generator 60 to motor/generator 66. A compound-split operating mode is beneficial for efficient operation during high-speed driving, as it allows for reduced motor speeds and decreased power through the electrical power path. That is, all of the mechanical power is not converted to electrical power, then converted again to mechanical power through the motor/generators 60, 66 as is the case in the series operating mode.

While the best modes for carrying out the invention have been described in detail, those familiar with the art to which this invention relates will recognize various alternative designs and embodiments for practicing the invention within the scope of the appended claims.

The invention claimed is:

1. A transmission in combination with an engine having a rotatable engine output member; the transmission comprising:
   an input member; wherein the input member is connected for rotation with the rotatable engine output member;
   an output member;
   a planetary gear set having a first member, a second member, and a third member;
   a first electric motor/generator having a first rotor connected for rotation with the first member of the planetary gear set;
   a second electric motor/generator having a second rotor connected for rotation with the second member of the planetary gear set;
   a first set of intermeshing gears having a first gear ratio;
   a second set of intermeshing gears having a second gear ratio different than the first gear ratio;
   a first torque-transmitting mechanism selectively engageable to establish torque flow between the planetary gear set and the input member through the first set of intermeshing gears;
   a second torque-transmitting mechanism selectively engageable to establish torque flow between the planetary gear set and the input member through the second set of intermeshing gears;
   a first input shaft; wherein the first torque-transmitting mechanism is selectively engageable to connect the input member for common rotation with the first input shaft;
   a second input shaft concentric with the first input shaft; wherein the second torque-transmitting mechanism is selectively engageable to connect the input member for common rotation with the second input shaft; and wherein the first and second torque-transmitting mechanisms are both disengaged to disconnect the engine from the transmission and the first and second motor/generators are operated as motors to establish at least one electric-only operating mode.

2. The transmission in combination with the engine having the rotatable engine output member of claim 1, wherein the first and the second torque-transmitting mechanisms establish torque flow between the input member and the third member of the planetary gear set; and further comprising:
a first transfer shaft substantially parallel with the first input shaft and the second input shaft; and wherein the first set of intermeshing gears transfers torque between the first input shaft and the first transfer shaft and the second set of intermeshing gears transfers torque between the second input shaft and the first transfer shaft.

3. The transmission in combination with the engine having the rotatable engine output member of claim 2, further comprising:
a third set of intermeshing gears having a third gear ratio;
a fourth set of intermeshing gears having a fourth gear ratio;
a third torque-transmitting mechanism selectively engageable to establish torque flow between the second motor/generator and the output member through the third set of intermeshing gears; and
a fourth torque-transmitting mechanism selectively engageable to establish torque flow between the second motor/generator and the output member through the fourth set of intermeshing gears.

4. The transmission in combination with the engine having the rotatable engine output member of claim 3, further comprising:
a second transfer shaft connected for common rotation with the second motor/generator;
a first output shaft; wherein the third set of intermeshing gears transfers torque from the second transfer shaft to the first output shaft; wherein the third torque-transmitting mechanism is selectively engageable to transfer torque from the first output shaft to the output member;
a second output shaft concentric with the first output shaft; wherein the fourth set of intermeshing gears transfers torque from the second transfer shaft to the second output shaft; and wherein the fourth torque-transmitting mechanism is selectively engageable to transfer torque from the second output shaft to the output member.

5. The transmission in combination with the engine having the rotatable engine output member of claim 1, wherein the torque-transmitting mechanisms are engaged at predetermined operating conditions selected so that speeds of the first and second rotors remain within a predetermined range of speeds.

6. The transmission in combination with the engine having the rotatable engine output member of claim 1, wherein at least one of the torque-transmitting mechanisms is a synchronizer.

7. The transmission in combination with the engine having the rotatable engine output member of claim 1, wherein the first member of the planetary gear set is a sun gear member, the second member of the planetary gear set is a ring gear member, and the third member of the planetary gear set is a carrier member supporting a plurality of pinion gears that mesh with both the sun gear member and the ring gear member.

8. The transmission in combination with the engine having the rotatable engine output member of claim 1, wherein the first and second torque-transmitting mechanisms are both engaged to thereby prevent rotation of the engine output member and the first and second motor/generators are operated as motors to establish at least one other electric-only operating mode.

9. The transmission in combination with the engine of claim 1,
wherein the first torque-transmitting mechanism is engaged to establish a first electrically-variable operating mode, with the engine on and the motor/generators functioning as motors or generators; and
wherein the second torque-transmitting mechanism is engaged to establish a second electrically-variable operating mode, with the engine on and the motor/generators functioning as motors or generators; the first and second electrically-variable operating modes thereby being power-split operating modes with different gear ratios established between the planetary gear set and the one of the input member and the output member.

10. The transmission of claim 1, in combination with the engine of claim 1,
wherein one of the first and second torque-transmitting mechanisms is engaged and the first motor/generator is operated as a motor to start the engine.

11. A transmission comprising:
an input member;
an output member;
a planetary gear set having a first member, a second member, and a third member;
a first electric motor/generator having a first rotor connected for rotation with the first member of the planetary gear set;
a second electric motor/generator having a second rotor connected for rotation with the second member of the planetary gear set;
a first input shaft;
a second input shaft concentric with the first input shaft;
a transfer shaft substantially parallel with the first and the second input shafts;
a first set of intermeshing gears having a first gear ratio, including a first gear connected for rotation with the first input shaft and meshing with a second gear connected for rotation with the transfer shaft;
a second set of intermeshing gears having a second gear ratio different than the first gear ratio, including a third gear connected for rotation with the second input shaft and meshing with a fourth gear connected for rotation with the transfer shaft;
a third set of intermeshing gears including a fifth gear connected for rotation with the transfer shaft and meshing with a sixth gear connected for rotation with the third member of the planetary gear set.
a first torque-transmitting mechanism selectively engageable to connect the input member for common rotation with the first input shaft, thereby establishing torque flow between the third member of the planetary gear set and the input member through the first set and the third set of intermeshing gears; and
a second torque-transmitting mechanism selectively engageable to connect the input member for common rotation with the second input shaft, thereby establishing torque flow between the third member of the planetary gear set and the input member through the second set and the third set of intermeshing gears, the transmission thereby being operable in a first input-split electrically-variable operating mode when the first torque-transmitting mechanism is engaged, the engine is on, and the motor/generators function as motors or generators, and in a second input-split electrically-variable operating mode when the second torque-transmitting mechanism is engaged, the engine is on, and the motor/generators function as motors or generators, the first and second input-split electrically-variable operating modes having different gear ratios between the input member and the planetary gear set.

12. A transmission comprising:
an input member;
an output member;
a planetary gear set having a first member, a second member, and a third member;
a first electric motor/generator having a first rotor connected for rotation with the first member of the planetary gear set;
a second electric motor/generator having a second rotor connected for rotation with the second member of the planetary gear set;
a first output shaft;
a second output shaft concentric with the first output shaft;
a transfer shaft substantially parallel with the first and the second output shafts and connected for rotation with the second member of the planetary gear set;
a first set of intermeshing gears having a first gear ratio, including a first gear connected for rotation with the first output shaft and meshing with a second gear connected for rotation with the transfer shaft;
a second set of intermeshing gears having a second gear ratio different than the first gear ratio, including a third gear connected for rotation with the second output shaft and meshing with a fourth gear connected for rotation with the transfer shaft;
a first torque-transmitting mechanism selectively engageable to provide torque flow between the first output shaft and the output member; and
a second torque-transmitting mechanism selectively engageable to provide torque flow between the second output shaft and the output member, the transmission thereby being operable in a first output-split electrically-variable operating mode when the first torque-transmitting mechanism is engaged, the engine is on, and the motor/generators function as motors or generators, and in a second output-split electrically-variable operating mode when the second torque-transmitting mechanism is engaged, the engine is on, and the motor/generators function as motors or generators, the first and second output-split electrically-variable operating modes having different gear ratios between the planetary gear set and the output member.

13. A transmission comprising:
an input member;
an output member;
a planetary gear set having a first member, a second member, and a third member;
a first electric motor/generator having a first rotor connected for rotation with the first member of the planetary gear set;
a second electric motor/generator having a second rotor connected for rotation with the second member of the planetary gear set;
a first set of intermeshing gears having a first gear ratio;
a second set of intermeshing gears having a second gear ratio different than the first gear ratio;
a first torque-transmitting mechanism selectively engageable to establish torque flow between the planetary gear set and the output member through the first set of intermeshing gears;
a second torque-transmitting mechanism selectively engageable to establish torque flow between the planetary gear set and the output member through the second set of intermeshing gears;
wherein the first torque-transmitting mechanism and the second torque-transmitting mechanism are each engageable to establish torque flow between the second member of the planetary gear set and the output member;
a transfer shaft connected for common rotation with the second motor/generator;
a final drive gearing arrangement connected with the output member;
a first output shaft; wherein the first set of intermeshing gears transfers torque between the transfer shaft and the first output shaft;
a second output shaft concentric with the first output shaft; wherein the second set of intermeshing gears transfers torque between the transfer shaft and the second output shaft;
wherein the first torque-transmitting mechanism is selectively engageable to transfer torque between the first output shaft and the final drive gearing arrangement; and
wherein the second torque-transmitting mechanism is selectively engageable to transfer torque between the second output shaft and the final drive gearing arrangement.

* * * * *